W. H. PUTNAM.
LUBRICATOR.
APPLICATION FILED JAN. 3, 1919.
1,313,204.
Patented Aug. 12, 1919.
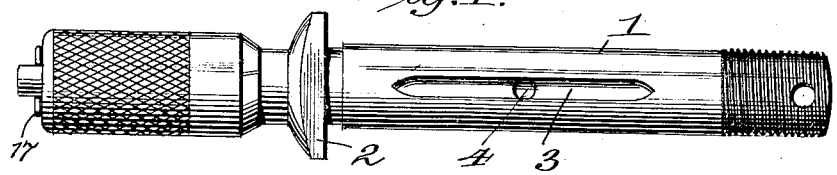
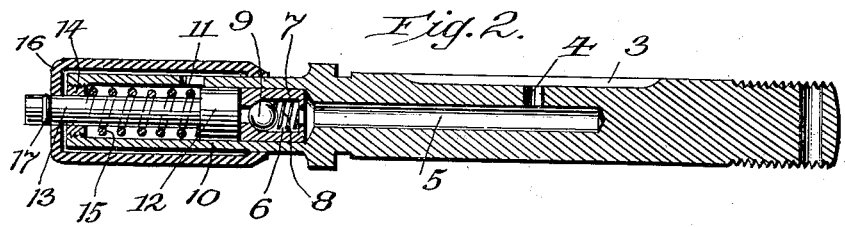
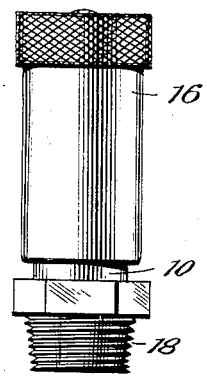 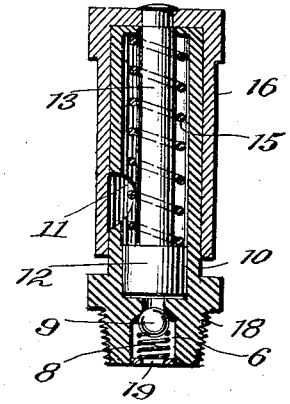 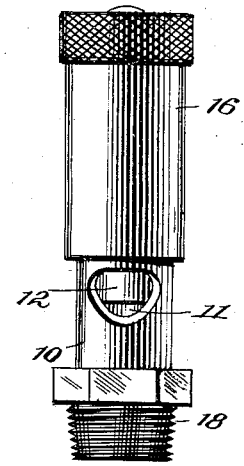
Inventor:
William Henry Putnam
By Dodge and Sons,
Attorneys.

UNITED STATES PATENT OFFICE.

WILLIAM HENRY PUTNAM, OF MADISON, WISCONSIN, ASSIGNOR TO MADISON-KIPP LUBRICATOR COMPANY, OF MADISON, WISCONSIN, A CORPORATION OF WISCONSIN.

LUBRICATOR.

1,313,204. Specification of Letters Patent. Patented Aug. 12, 1919.

Application filed January 3, 1919. Serial No. 269,448.

*To all whom it may concern:*

Be it known that I, WILLIAM HENRY PUTNAM, a citizen of the United States, residing at Madison, in the county of Dane and State of Wisconsin, have invented certain new and useful Improvements in Lubricators, of which the following is a specification.

This invention pertains to lubricators and has for its main object the production of a lubricator of the force feed type adapted more especially for use upon motor vehicles though its use in the broader aspect of the invention is not so limited.

The invention lends itself particularly to the lubrication of shackle bolts and in the drawings, Figure 1 is a plan view of such a bolt with the lubricator formed as an integral part thereof;

Fig. 2 a longitudinal sectional view thereof;

Fig. 3 a side elevation of a form adapted to be employed in place of the standard grease cup;

Fig. 4 a longitudinal sectional view, and

Fig. 5 an elevation with the outside shell or thimble drawn back.

Referring first to Figs. 1 and 2, 1 denotes the body of the bolt which between its outer threaded end and the head portion 2 is scarfed or cut away to a slight extent along one side as at 3, forming in connection with the shackle eye into which the body is inserted, a reservoir or chamber. A lateral port 4 extends from such scarfed portion into an axially disposed port 5 which in the construction illustrated opens into a valve cage or chamber 6. Said chamber is produced by a cup shaped member 7 open at each end and containing a check valve 9 which is held against its seat in the outer end of the cup-shaped member by a spring 8.

Said member 7 is seated within the inner end of a cylinder or cylindrical member 10 formed as an extension of the bolt body and in the instant case shown as an integral extension thereof. The cylinder is provided with a lateral opening 11 and a piston 12 is mounted within the cylinder making a close fit with the wall thereof. A rod or stem 13 extends outwardly from the piston passing through a bushing or washer shaped member 14 which is threaded or spun into the outer end of the cylinder. A spring 15 encircles the piston rod and bearing against the bushing and the piston 12 acts to force the piston inwardly.

The piston rod passes through the head or closed end of a shell or thimble 16, said member surrounding the outer wall of the piston and preferably slightly spaced therefrom except at the inner end of the shell where it makes a close fit with the exterior smooth finished wall of the cylinder.

The outer surface of the shell or thimble will be knurled to afford an adequate hand hold, and a cotter pin 17 is passed through the outer end of the piston rod to lock the shell or thimble thereto.

In operation the sliding shell 16 is drawn outwardly, the stem or rod 13 and the attached piston 12 moving therewith. Such outward movement puts spring 15 under compression, and when the spring bottoms, the piston 12 will have passed the opening 11 and the inner end of the shell will have just cleared the opening. While the parts are in this position oil is introduced into the cylinder in advance of the piston through opening 11, filling the cylinder. Upon release of the shell spring 15 forces the piston inwardly and forces the oil inwardly past valve 9, through the valve cage or chamber and into port 5 from whence it is discharged through port 4 and into the chamber 3 formed by the scarfed portion 3 of the bolt body.

The inward movement of the piston and stem or rod 13 carries the shell 16 with them, covering port or opening 11 and in fact the entire outer surface of the cylinder thereby protecting such surface from dust and dirt and likewise preventing the access of moisture and consequent corrosion.

In Figs. 3 to 5 a slightly different embodiment of the invention is shown. Instead of forming the cylinder as an extension of a bolt body the cylinder extends from an externally threaded element 18 in which the valve cage is formed, the spring for the valve being held up to the latter by a perforate disk or washer 19 threaded or driven into the outer end of the member 18, or by the member being spun or swaged over to hold the spring. The other parts are of substantially the same construction as above set forth though in this case no clearance is shown between the sliding shell and the outer face of the cylinder and the piston stem is riveted to the outer end of the shell.

The threaded member 18 is designed to be screwed into the opening usually provided for the standard grease cups which are frequently employed to lubricate shackle bolts and their allied parts.

The structures as above set forth are comparatively simple to manufacture, are efficient and do not get out of order.

In the claims the bolt and member 18 are to be treated as equivalents under the term ported attaching member except where the bolt is specifically recited.

What is claimed is:

1. A lubricator comprising in combination a ported attaching member; a cylinder extending therefrom, said cylinder having a feed opening in one side thereof; a non-return valve preventing return of lubricant to the cylinder from the ported member; a piston mounted in the cylinder; a piston rod extending from the piston to and through the outer end of the cylinder; a spring acting to force the piston inwardly; and a shell attached to the outer end of the piston rod and covering the outer face of the cylinder.

2. In a lubricator, the combination of a ported attaching member; a cylinder extending outwardly therefrom, said cylinder having a feed opening in the side wall thereof; a valve chamber located adjacent the inner end of the cylinder; a spring actuated valve mounted in the chamber and acting to prevent return flow of lubricant into the cylinder; a piston working in the cylinder; a rod extending from the piston through the outer end of the cylinder; a spring acting to force the piston inwardly; and a shell mounted to slide upon the outer face of the cylinder and attached to the rod, said shell covering the feed opening aforesaid when the piston is moved inwardly.

3. In a lubricator, the combination of a shackle bolt having a recess formed in the side face thereof; a port opening into said recess and a second port extending longitudinally of the bolt; a cylinder formed integral with the bolt and extending from one end thereof, the last named port opening into said cylinder and said cylinder being provided with a feed opening in its side wall; a piston and piston rod mounted in said cylinder; a non-returning valve located in the lower portion of the cylinder; and a shell mounted upon the exterior of the cylinder and connected with the piston rod.

4. In a lubricator, the combination of a shackle bolt having a scarfed portion along one face with a transverse port opening into said scarfed portion and opening at its inner end into a longitudinally disposed port formed in the bolt; a cylinder formed as an integral extension of the said bolt; a valve cage mounted in the inner end of the cylinder in line with the axial bore or port formed in the bolt; a valve seated in said cage; a spring urging said valve outwardly to close the port in the cage which leads to the cylinder; a piston mounted in said cylinder; a stem extending outwardly from the piston beyond the end of the cylinder; a washer-shaped member secured in the outer end of the cylinder and through which the piston rod extends; a spring surrounding the stem and bearing at its opposite ends upon the piston and washer-shaped member and serving to force the piston inwardly past a port formed in the side wall of the cylinder; a shell surrounding the cylinder and substantially co-extensive thereof; and means for securing the shell and the piston rod together.

In testimony whereof I have signed my name to this specification.

WILLIAM HENRY PUTNAM.